(12) United States Patent
Zielke

(10) Patent No.: US 8,600,629 B2
(45) Date of Patent: Dec. 3, 2013

(54) COMPENSATION METHOD FOR PLANTER SHUT OFF DELAY

(75) Inventor: Roger R. Zielke, Huxley, IA (US)

(73) Assignee: AG Leader Technology, Ames, IA (US)

( * ) Notice: Subject to any disclaimer, the term of this patent is extended or adjusted under 35 U.S.C. 154(b) by 257 days.

(21) Appl. No.: 13/193,315

(22) Filed: Jul. 28, 2011

(65) Prior Publication Data

US 2013/0030565 A1    Jan. 31, 2013

(51) Int. Cl.
*A01C 7/00* (2006.01)

(52) U.S. Cl.
USPC ............. 701/50; 700/232; 111/200; 111/900; 111/903; 340/501; 340/684

(58) Field of Classification Search
USPC ......... 701/50, 1; 700/232; 111/200, 900, 903; 221/2, 3, 6–8; 340/501, 518, 520, 608, 340/609, 617, 674, 684; 377/6, 16, 17, 24, 377/26, 32
See application file for complete search history.

(56) References Cited

U.S. PATENT DOCUMENTS

| | | | |
|---|---|---|---|
| 4,491,241 A * | 1/1985 | Knepler et al. | ............ 221/3 |
| 2002/0170476 A1 | 11/2002 | Bogner et al. | |
| 2010/0101467 A1 | 4/2010 | Johnson | |
| 2010/0131095 A1 | 5/2010 | Zielke et al. | |

* cited by examiner

*Primary Examiner* — Christopher J Novosad
(74) *Attorney, Agent, or Firm* — McKee, Voorhees & Sease, P.L.C.

(57) ABSTRACT

A method for compensating for planter shut off delay in a planter includes automatically calculating by an intelligent control associated with the planter, a time delay look-ahead distance based on groundspeed of the planter and a time delay, and a total look-ahead distance based on the time delay look-ahead distance and a distance delay look ahead distance. The method further includes determining by the intelligent control if seeding should be off or on at a point in the field at the total look ahead distance, and sending a signal to a row shutoff device of the planter to control the seeding. A control system is also provided.

17 Claims, 7 Drawing Sheets

COMPENSATION METHOD FOR PLANTER SHUT OFF DELAY

FIELD OF THE INVENTION

The present invention relates to planters. More specifically, the present invention relates to compensating for planter shut-off delay in planters.

BACKGROUND OF THE INVENTION

It is known in the art that planter row shut off control systems that accurately turn planting on and off must compensate for the delay in the system to turn seeding on and off at each row. The mechanical devices that turn planting on and off at the row can be categorized by their type of delay. The types of delay include time delay and time and distance delay.

Time Delay

This row shut off device STOPS PLANTING by disengaging the seed meter drive from the seed meter. The seed meter carrying the seed stops rotating which causes the seed meter to stop dispensing seed into the soil. PLANTING resumes when the row shut off device engages the seed meter drive to the seed meter. The seed meter carrying the seed starts rotating which causes the seed meter to dispense seed into the soil.

The delay between when the controller signals to turn planting on or off and when the row shut off device actually changes planting at the row is quantified by time only in time delay row shut off devices. The delay is a function of how long it takes the controller to send the control signal to the row shut off device and the response time of the row shut off device to start or stop seed meter rotation.

Time and Distance Delay

This row shut off device STOPS PLANTING by causing seeds to fall off a rotating seed meter before the meter dispenses the seed into the soil. In this state, the seeds fall back into the seed meter's seed reservoir. PLANTING resumes when the row shut off device allows the rotating seed meter to carry seed to the point it dispenses the seed into the soil.

The delay between when the controller signals a change in planting state and when the row shut off device actually changes planting at the row is quantified by time and distance traveled. The time delay is a function of how long it takes the controller to send the control signal to the row shut off device and the response time of the row shut off device to prevent or allow the rotating seed meter to carry seeds to the area where they are dispensed into the soil. The distance traveled delay is a function of the seed spacing multiplied by the number of seed cells between the radial location of the row shut off device on the meter and the point where the seed meter dispenses seed into the soil. The controller must compensate for the time delay and distance delay in order to accurately turn planting on and off. What is needed is a compensation method for planter shut off delay which automatically compensates for distance.

SUMMARY OF THE INVENTION

Therefore, it is a primary object, feature, or advantage of the present invention to improve over the state of the art.

It is a further object, feature, or advantage of the present invention to provide a compensation method for planter shut off delay which automatically compensates for distance.

One or more of these and/or other objects, features, or advantages of the present invention will become apparent from the specification and claims that follow. No single embodiment need exhibit all of these objects, features, or advantages.

According to one aspect of the present invention, a method for compensating for planter shut off delay in a planter is provided. The method includes automatically calculating by an intelligent control associated with the planter, a time delay look-ahead distance based on groundspeed of the planter and a time delay and calculating by the intelligent control a total look-ahead distance based on the time delay look-ahead distance and a distance delay look ahead distance. The method further includes determining by the intelligent control if seeding should be off or on at a point in the field at the total look ahead distance, and sending a signal to a row shutoff device of the planter to control the seeding.

According to another aspect of the present invention, a control system for a planter is provided. The control system includes a plurality of row shut off devices each associated with a row unit of the planter, and an intelligent control operatively connected to each of the plurality of row shut off devices. For each of the row units, the intelligent control performs steps of (a) automatically calculating by an intelligent control associated with the planter, a time delay look-ahead distance based on groundspeed of the planter and a time delay, (b) calculating by the intelligent control a total look-ahead distance based on the time delay look-ahead distance and a distance delay look ahead distance, (c) determining by the intelligent control if seeding should be off or on at a point in the field at the total look ahead distance, and (d) sending a signal to a corresponding one of the row shutoff devices of the planter to control the seeding.

According to another aspect of the present invention, a method for compensating for planter shut off delay in a planter is provided. The method includes providing a control system associated with the planter, the control system comprising a seed meter and a row shut off unit for each row of the planter, an intelligent control operatively connected to each seed meter and each row shut off unit, and a user interface operatively connected to the intelligent control. The method further includes receiving a distance delay look ahead distance from an operator of the planter through the user interface. The method further provides that for each row unit, performing steps of (a) automatically calculating by the intelligent control, a time delay look-ahead distance based on groundspeed of the planter and a time delay, (b) calculating by the intelligent control a total look-ahead distance based on the time delay look-ahead distance and the distance delay look ahead distance, (c) determining by the intelligent control if seeding should be off or on at a point in the field at the total look ahead distance, and (d) sending a signal to a row shutoff device of the planter to control the seeding.

According to another aspect of the present invention, a method for compensating for planter shut off delay in a planter is provided. The method includes providing a control system associated with the planter, the control system comprising a seed meter and a row shut off unit for each row of the planter, and an intelligent control operatively connected to each seed meter and each row shut off unit. The method further provides that for each row unit performing steps of (a) automatically calculating by the intelligent control, a time delay look-ahead distance based on groundspeed of the planter and a time delay, (b) automatically calculating by the intelligent control a distance delay look ahead distance (b) calculating by the intelligent control a total look-ahead distance based on the time delay look-ahead distance and the distance delay look ahead distance, (c) determining by the intelligent control if seeding should be off or on at a point in the field at the total look ahead distance, and (d) sending a signal to a row shutoff device of the planter to control the seeding.

According to another aspect of the present invention, a method for compensating for planter shut off delay in a planter is provided. The method includes providing a control system associated with the planter, the control system comprising a seed meter and a row shut off unit for each row of the planter, and an intelligent control operatively connected to each seed meter and each row shut off unit, and for each row unit, (a) determining if the row shut off unit is in a planting state, (b) if not in a planting state rotating the seed meter to compensate for distance delay, and (c) resuming seed meter rotation at a time when planting is turned on.

BRIEF DESCRIPTION OF THE DRAWINGS

FIG. 8 is a flow chart illustrating a method for calculating how much the seed meter must be rotated after planting has been shutoff to eliminate the need for the controller or intelligent control to compensate for the distance delay the next time planting is turned on.

DETAILED DESCRIPTION OF THE PREFERRED EMBODIMENTS

Figure 1:
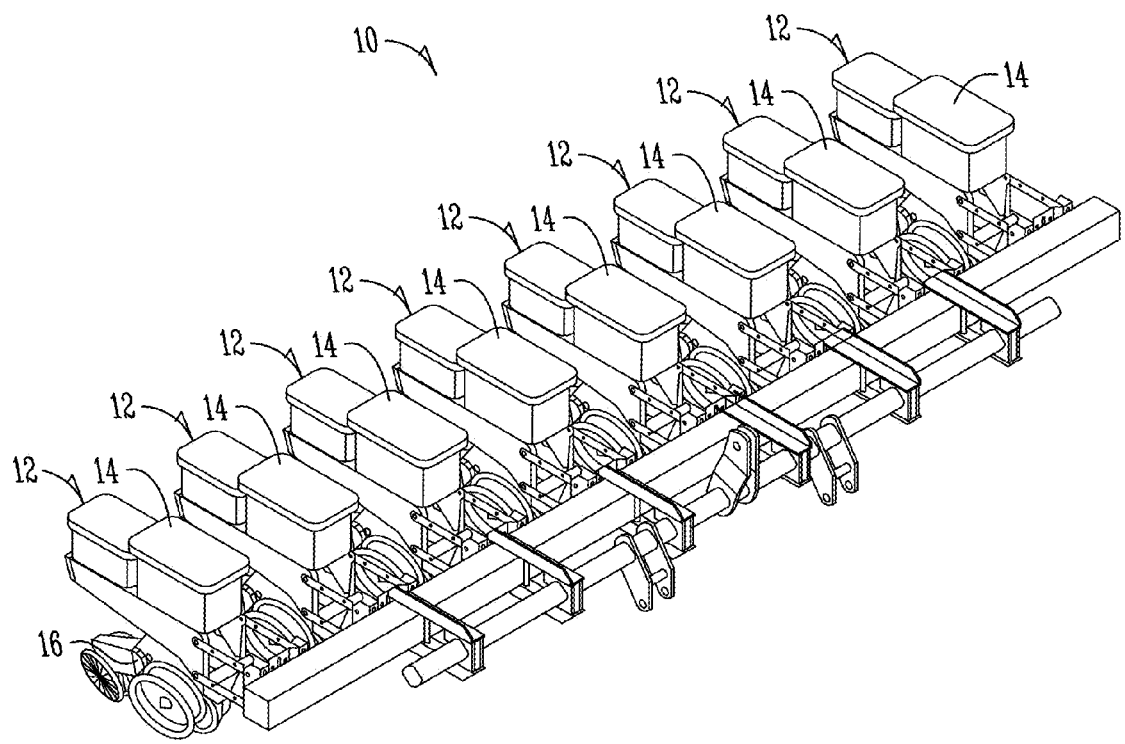
FIG. 1 illustrates one example of an agricultural planter of the present invention.

FIG. 1 illustrates one example of an agricultural or precision planter 10 which may be used with the present invention. The agricultural planter 10 has a plurality of row units 12. Each row unit 12 has a seed bin or hopper 14 for holding seed. Each row unit 12 also has a seed meter 16 which provides for dispensing seed at a desired rate along a row.

Figure 2:
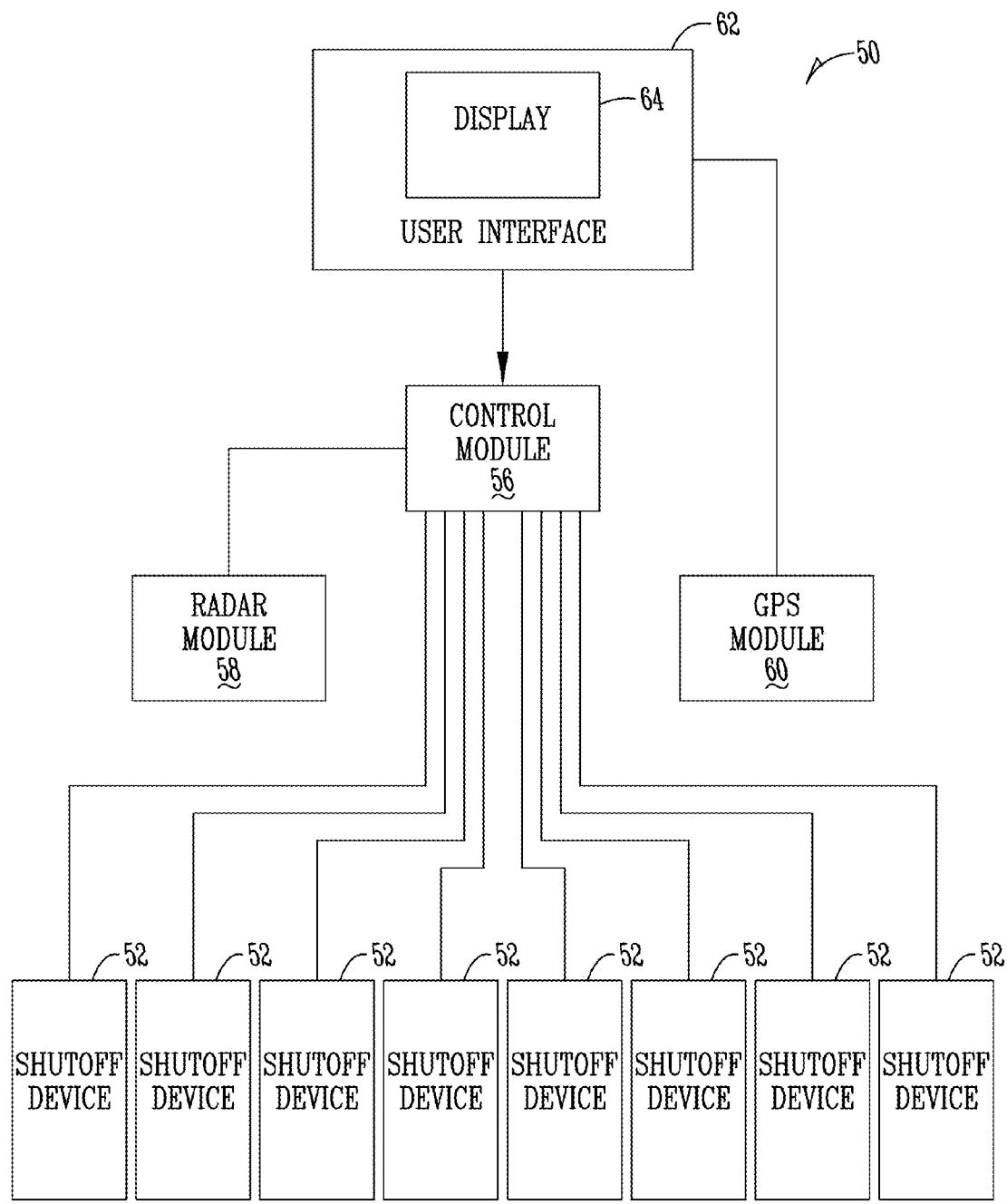
FIG. 2 illustrates one example of the electronic control system of the present invention which may be used on an agricultural planter.

FIG. 2 illustrates one example of an electronic control system 50 which may be used on or with the planter of FIG. 1. The electronic control system 50 includes a plurality of row shutoff devices 52 with each row unit of the planter having a row shutoff device 52.

Each of the row shutoff devices 52 is electrically connected to a control module 56.

The control module 56 may also be operatively connected to an optional radar module 58. A user interface 62 may also be electrically connected to the control module 58 and a GPS module 60. The user interface 62 may include a display 62 as well as one or more buttons or other manual inputs (not shown). Thus, the control module 56 may provide for receiving user input information from the user interface 62 as well as to provide status information or other information to the user through the display 64.

Figure 3:
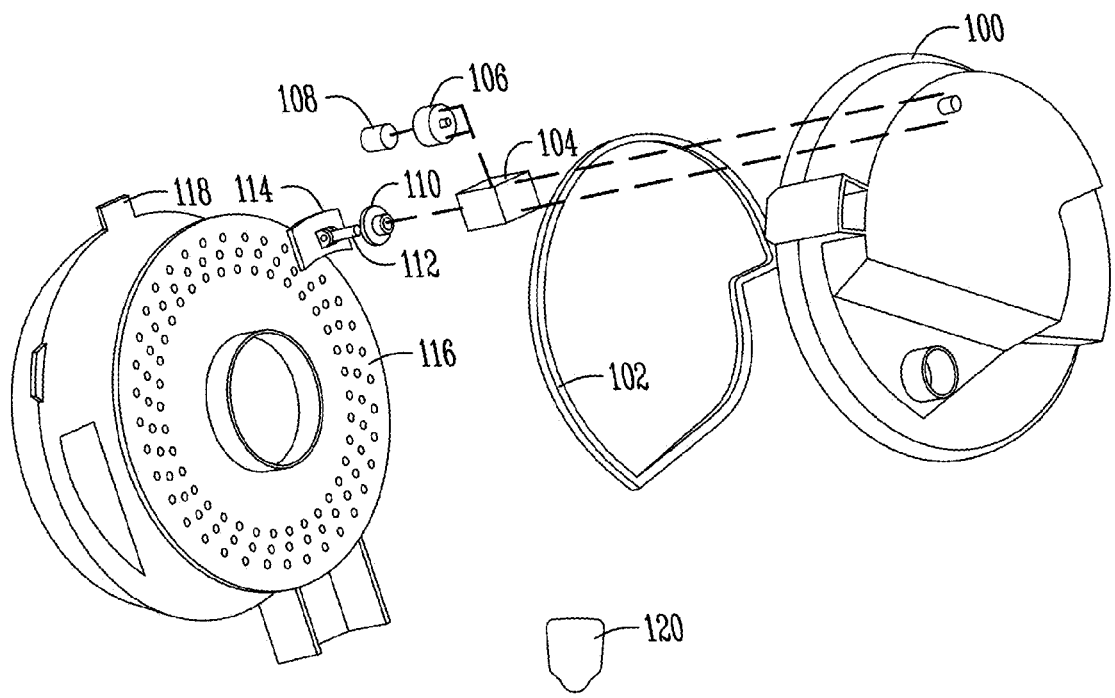
FIG. 3 is an exploded view of one embodiment of a row shutoff device for use on an agricultural planter.
Figure 4:
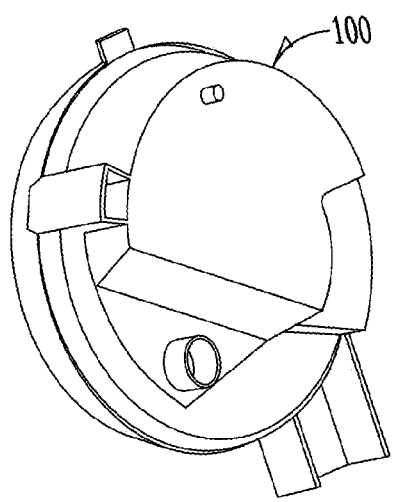
FIG. 4 illustrates the row shutoff device of FIG. 3 in an assembled position.

FIG. 3 and FIG. 4 illustrate one embodiment of a shutoff device. The device shown in FIG. 3 and FIG. 4 is described in U.S. Patent Application Publication No. 2010/0131095 to Zielke et al. and is herein incorporated by reference in its entirety. The device shown in FIG. 3 and FIG. 4 is one example of a vacuum controlled seed meter 100. A pneumatic seed meter disc 116 has perforated seed pockets symmetrically placed around the disc in a concentric pattern. One side of the disc 116 (called the seed side) rotates through a supply of seed at the bottom of the disc 116. Either positive air pressure or a vacuum creates a pressure differential across the disc 116 that causes each seed pocket in the disc 116 to pick up and hold a seed against the disc 116 until it rotates outside of the air chamber. Once outside the air chamber, the disc 116 is no longer under a pressure differential, which causes the seed to fall off the disc 116 into the soil.

A pad 114 is held against or away from the side of a pneumatic seed disc 116 by an actuator having a solenoid 106, a return spring 108 that pulls the pad 114 away from the disc 116 when the solenoid 106 is not actuated, a bushing 110 and a solenoid activation shaft 112. The pad 114 is positioned on the non-seed side of the disc 116. When the pad 114 is held against the disc 116 by actuation of the solenoid 106, it covers one or more seed pockets rotating through the air chamber, carrying seed. This removes or disrupts the pressure differential across those seed pockets causing the seed to fall off the disc 116 before the seed rotates outside the air chamber. The result is that the affected seeds fall back into the seed supply instead of into the soil. When the pad 114 is held away from the disc 116 (when the solenoid 106 is not activated resulting in the return spring 108 retracting the pad 114), the pressure differential is maintained, which allows the disc 116 to carry the seed outside the air chamber and drop it into the soil. A rotating wheel 10 may be positioned in the same location and controlled in the same manner as the pad 114 and brought in contact with the disc 119 to shut off seeding on pneumatic seed meters.

The shutoff device shown in FIG. 3 and FIG. 4 is merely one example of a shutoff device appropriate for use in pneumatic seed meters. The present invention is in no way limited to this type of shutoff device or seed meter. The present invention may be used with mechanical seed meters such as and other types of seed meters provided that seeding can be shutoff through electronic control.

Figure 5:
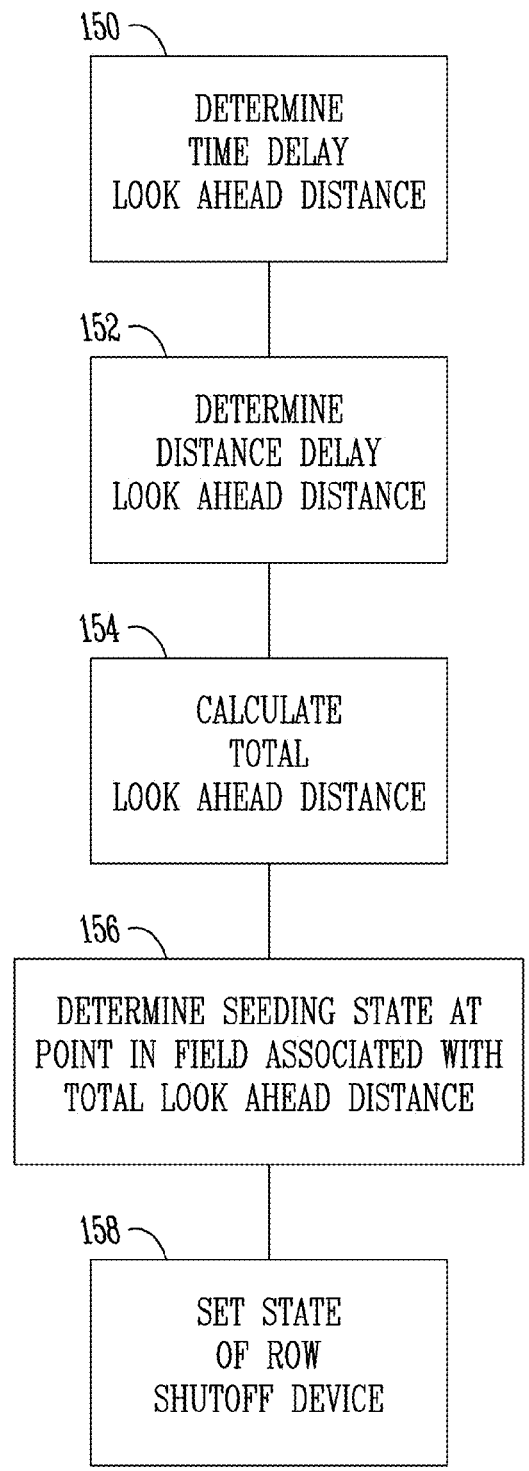
FIG. 5 is a flow chart illustrating one example of a methodology of the present invention.

FIG. 5 illustrates one example of a methodology of the present invention. In step 150 the method determines a time delay look-ahead distance. In step 152 the method determines a distance delay look-ahead distance. The distance delay look-ahead distance can be determined in various ways. Both the time delay look-ahead distance as well as the distance delay look-ahead distance may be determined in various ways, including those discussed with respect to FIG. 6 and FIG. 7.

In step 154 a total look ahead distance is calculated. The total look ahead distance may be calculated as the sum total of the time delay look-ahead distance and the distance delay look-ahead distance.

In step 156 a seeding state is determined at a point in the field associated with the total look ahead distance. Where geo-coordinates are being used for position information, the seeding state may be determined by identifying the geo-position of the point in the field based on the current position of the row unit and the total look ahead distance and then determining what the appropriate seeding state is for that geo-position. The seeding state may be an on state or may be an off state.

In step 158, once the desired seeding state is determined the state of the row shutoff device may be set. Thus if seeding is not desired the row shutoff device may be activated to prevent seeding. Similarly, if seeding is desired the row shutoff device be in an inactive state which allows for seeding to occur.

The methodology of FIG. 5 may be continuously repeated as the planter traverses the field. The methodology of FIG. 5 is advantageous because it allows distance delay look-ahead distance to be taken into account.

Figure 6:
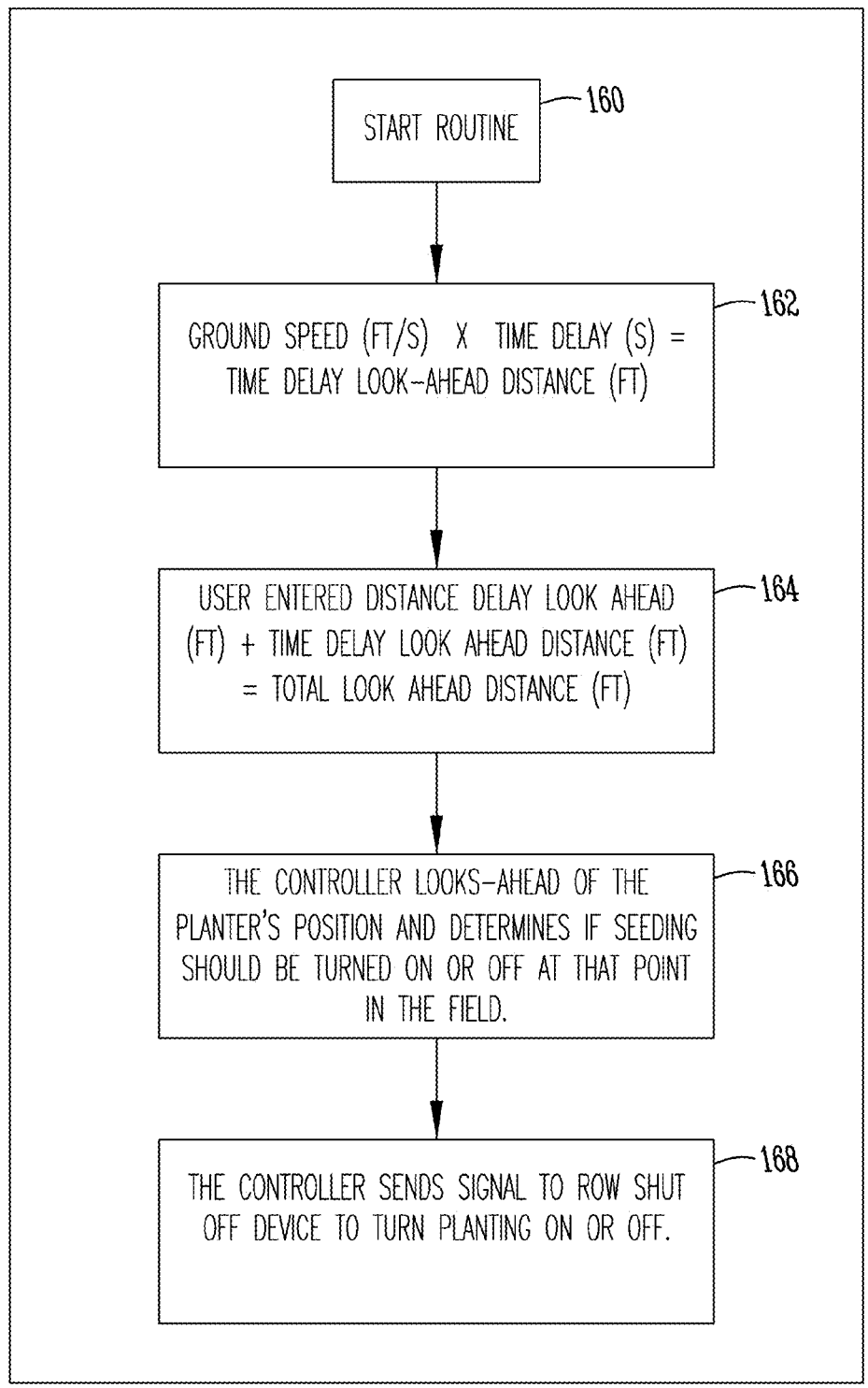
FIG. 6 is a flow chart illustrating a method for calculating a look-ahead distance that compensates for time and distance delay of a row shut off device wherein the controller or intelligent control automatically calculates time delay look-ahead distance and adds a user entered distance delay look-ahead distance to get a total look-ahead distance.

FIG. 6 illustrates another embodiment of the methodology. In FIG. 6, a control algorithm calculates a look-ahead distance that compensates for time and distance delay of a row shut off device wherein the controller automatically calculates time delay look-ahead distance and adds a user entered distance delay look-ahead distance to get a total look-ahead distance.

In step 160, the routine starts. The routine may be a routine executing on the control module or other intelligent control.

In step 162, the time delay look-ahead distance is calculated in feet. The time delay look-ahead distance is the product of the ground speed (feet per second) and the time delay (seconds).

In step 164, the total look ahead distance is calculated in feet. The total look ahead distance is calculated here as the sum of a user entered distance delay look ahead distance (feet) and a time delay look ahead distance which is calculated in step 162.

In step 166, controller looks-ahead of the planter's position and determines if seeding should be turned on or off at that point in the field. In step 168, the controller sends a signal to the row shut off device to turn planting on or off.

Figure 7:
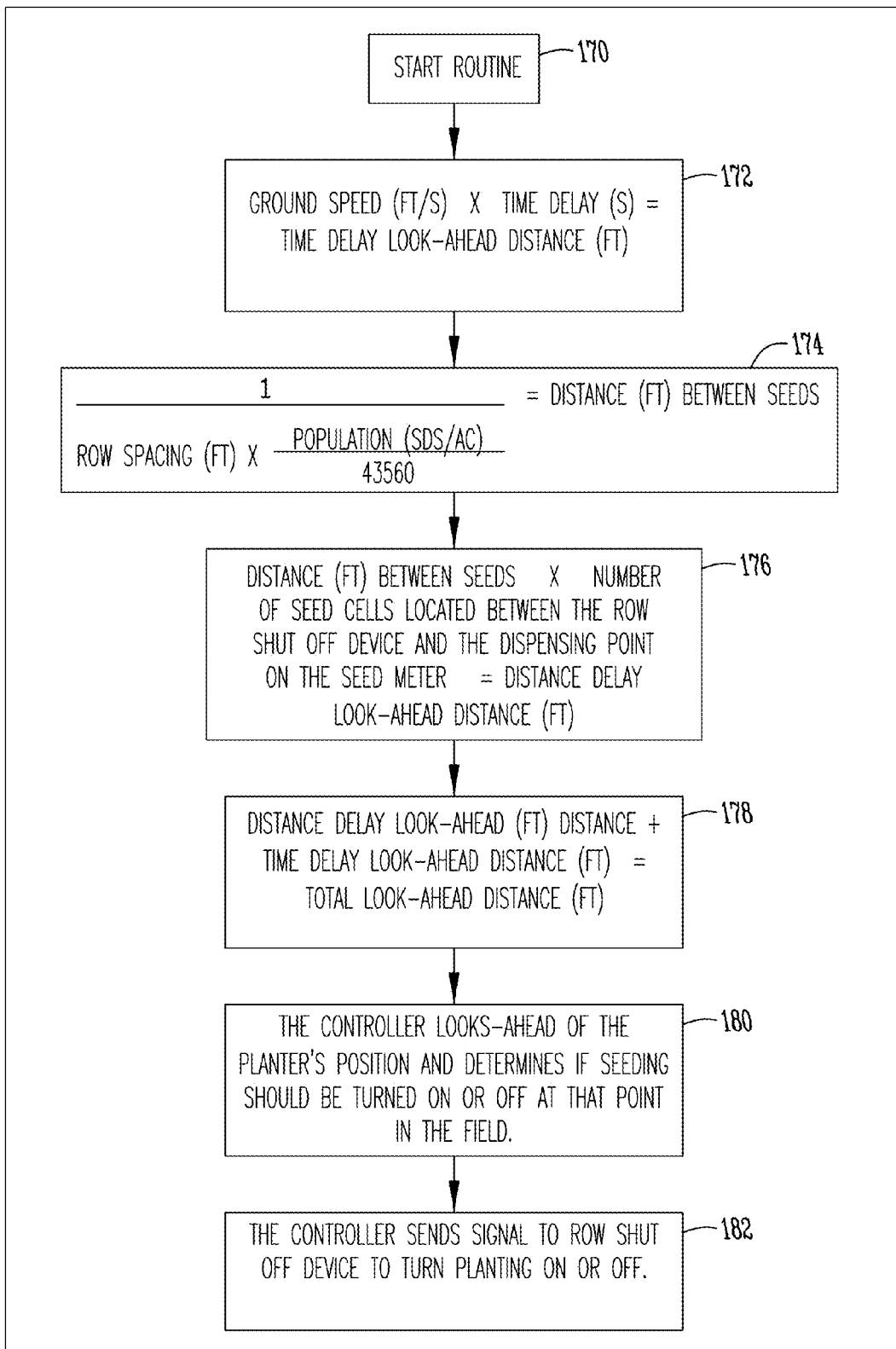
FIG. 7 is a flow chart illustrating a method for calculating a look-ahead distance that compensates for time and distance delay of a row shut off device where the controller or intelligent control automatically calculates time delay look-ahead distance and automatically calculates distance delay look-ahead distance and sums both to determine a total look-ahead distance.

FIG. 7 illustrates another embodiment of the methodology. In FIG. 7, in step 170 the routine starts. In step 172 the time delay look-ahead distance is calculated in feet. The time delay look-ahead distance is calculated as the product of the ground speed (feet per second) and the time delay (seconds).

In step 174 the distance (in feet) between seeds is calculated. This may be calculated as shown to determine a distance (in feet) between seeds. In step 176 the distance delay look-ahead distance (in feet) is calculated as the product of the distance (in feet) between the seeds (such as that calculated in step 174) and the number of seed cells located between the row shut off device and the dispensing point associated with the seed meter.

In step 178 the total look-ahead distance (in feet) is calculated by summing the distance delay look-ahead (feet) and the time delay look-ahead distance (feet).

In step 180 the intelligent control or controller looks-ahead of the planter's current position and determines if seeding should be turned on or off at that point the field. In step 182, the controller sends a signal to the row shut off device to planting on or off.

The methodology may be continuously repeated as the planter traverse a field. The methodology shown in FIG. 7 is potentially advantageous over the methodology shown in FIG. 6 because there is no need for the user to manually enter the distance delay look-ahead distance and because the methodology automatically compensates for an on-the-go change in planting rate.

Figure 8:
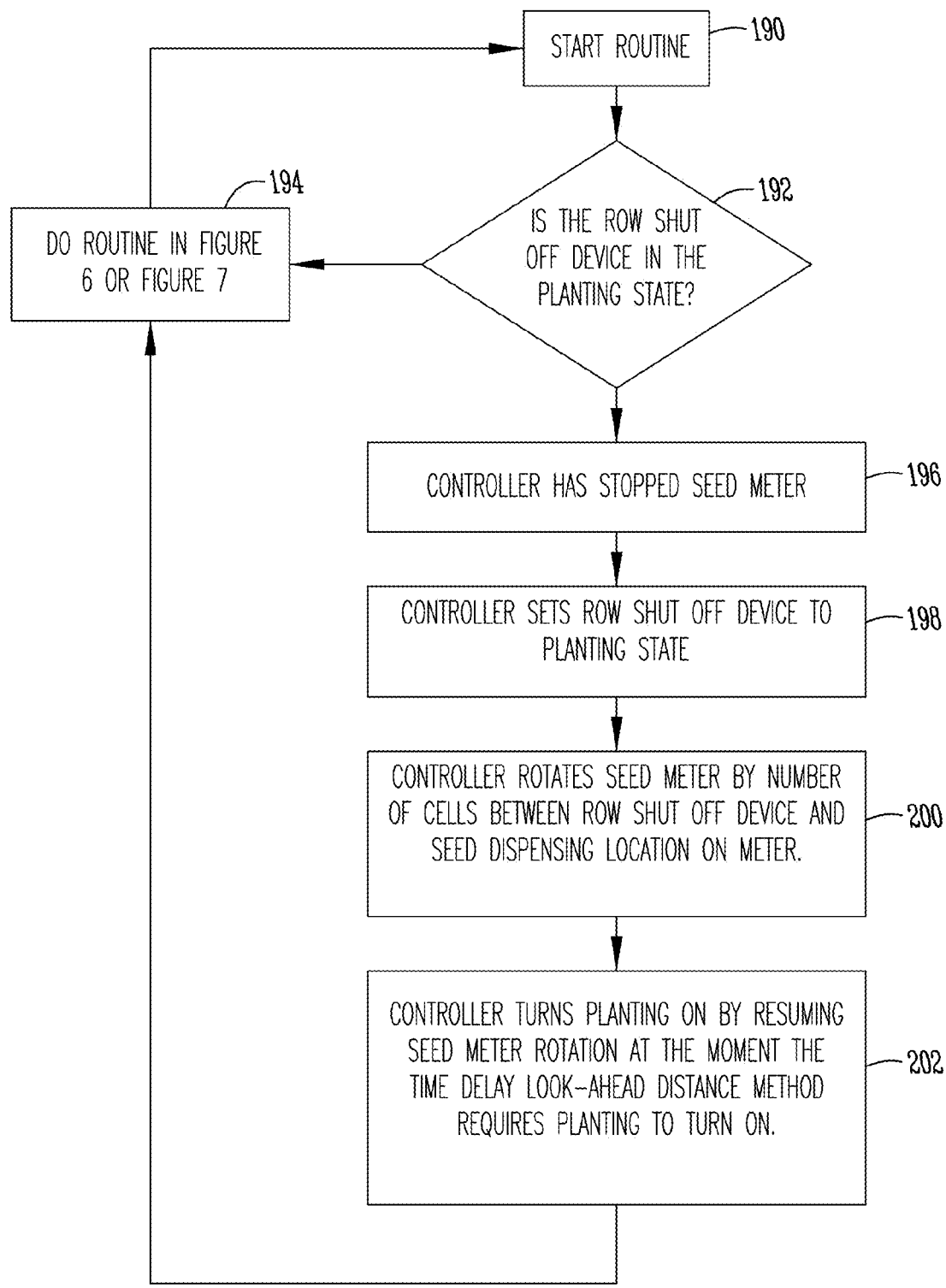

FIG. 8 illustrates another methodology of the present invention. In FIG. 8, a determination is made as to how much the seed meter must be rotated after planting has been shut off to eliminate the need for the controller or intelligent control to compensate for the distance delay the next time planting is turned on. In step 190 the process or routine starts. In step 192 a determination is made as to whether or not the row shut off device is in the PLANTING state. If it is then the process of FIG. 6 or FIG. 7 is performed. If not, then in step 196, the controller or intelligent control has stopped the seed meter. In step 198 the controller or intelligent control sets the row shutoff device to a PLANTING state. In step 200 the controller or intelligent control rotates the seed meter by the number of cells between the row shutoff device and the seed dispensing location on the meter. In step 202 the controller or intelligent control turns PLANTING on by resuming seed meter rotation at the moment the time delay look-ahead distance method requires PLANTING to turn on.

Methods for compensating for planter shut off delay in a planter have been described. It should be apparent that the present invention contemplates numerous variations, options, and alternatives as may be appropriate in a particular application or context. For example, the present invention contemplates variations in the type of planter, the type of seed meter, the type of row shut off device being used, the method of determining the distance delay look ahead distance. The present invention is not to be limited to the specific details of the particular embodiments described herein, but only by the claims.

What is claimed is:

1. A method for compensating for planter shut off delay in a planter, the method comprising:
   automatically calculating by a controller associated with the planter, a time delay look-ahead distance based on groundspeed of the planter and a time delay for planter shut off;
   calculating by the controller a total look-ahead distance based on the time delay look-ahead distance and a distance delay look ahead distance;
   determining by the controller if seeding should be off or on at a point in a field at the total look ahead distance; and
   sending a signal to a row shutoff device of the planter to control the seeding.

2. The method of claim 1 further comprising receiving the distance delay look ahead distance from an operator of the planter through a user interface associated with the controller of the planter.

3. The method of claim 1 further comprising automatically calculating by the controller the distance delay look ahead distance.

4. The method of claim 3 further comprising automatically calculating a distance between seeds.

5. The method of claim 4 wherein the distance delay look ahead distance is calculated as a product of the distance between seeds and number of seed cells located between the row shutoff device and a dispensing point on a seed meter of the planter.

6. The method of claim 1 further comprising determining that the row shut off device is not planting and then rotating a seed meter of the planter a distance to eliminate distance delay when planting is turned on.

7. A control system for a planter, the control system comprising:
   a plurality of row shut off devices each associated with a row unit of the planter;
   a controller operatively connected to each of the plurality of row shut off devices, wherein for each of the row shut off devices the controller performs steps of (a) automatically calculating by an intelligent control associated with the planter, a time delay look-ahead distance based on groundspeed of the planter and a time delay for planter shut off, (b) calculating by the controller a total look-ahead distance based on the time delay look-ahead distance and a distance delay look ahead distance, (c) determining by the controller if seeding should be off or on at a point in a field at the total look ahead distance, and (d) sending a signal to a corresponding one of the row shutoff devices of the planter to control the seeding.

8. The control system of claim 7 further comprising a seed meter for each row unit of the planter, each row unit operatively connected to the controller and wherein for each row unit the controller determines that the row shut off device is not planting and then rotates a seed meter of the row unit a distance to eliminate distance delay when planting is turned on.

9. The control system of claim 7 further comprising a user interface operatively connected to the controller and wherein the controller performs a step of receiving the distance delay look ahead distance from an operator of the planter through the user interface.

10. The control system of claim 7 wherein the controller performs a step of automatically calculating the distance delay look ahead distance.

11. The control system of claim 10 wherein the controller further performs a step of automatically calculating a distance between seeds.

12. The control system of claim 11 wherein the distance delay look ahead distance is calculated as a product of the distance between seeds and number of seed cells located between the row shutoff device and a dispensing point on a seed meter of the planter.

13. A method for compensating for planter shut off delay in a planter, the method comprising:
    providing a control system associated with the planter, the control system comprising a seed meter and a row shut off unit for each row of the planter, a controller operatively connected to each seed meter and each row shut off unit, and a user interface operatively connected to the controller;
    receiving a distance delay look ahead distance from an operator of the planter through the user interface;
    for each row unit, (a) automatically calculating by the controller, a time delay look-ahead distance based on groundspeed of the planter and a time delay for planter shutoff, (b) calculating by the controller a total look-ahead distance based on the time delay look-ahead distance and the distance delay look ahead distance, (c) determining by the controller if seeding should be off or on at a point in a field at the total look ahead distance, and (d) sending a signal to a row shutoff device of the planter to control the seeding.

14. The method of claim 13 further comprising for each row unit, when the row shut off device is not planting, rotating the seed meter of the planter a distance to eliminate distance delay when planting is turned on.

15. A method for compensating for planter shut off delay in a planter, the method comprising:
    providing a control system associated with the planter, the control system comprising a seed meter and a row shut off unit for each row of the planter, and an a controller operatively connected to each seed meter and each row shut off unit;
    for each row unit, (a) automatically calculating by the controller, a time delay look-ahead distance based on groundspeed of the planter and a time delay for planter shutoff, (b) automatically calculating by the controller a distance delay look ahead distance (b) calculating by the controller a total look-ahead distance based on the time delay look-ahead distance and the distance delay look ahead distance, (c) determining by the controller if seeding should be off or on at a point in a field at the total look ahead distance, and (d) sending a signal to a row shutoff device of the planter to control the seeding.

16. The method of claim 15 further comprising for each row unit, when the row shut off device is not planting, rotating the seed meter of the planter a distance to eliminate distance delay when planting is turned on.

17. A method for compensating for planter shut off delay in a planter, the method comprising:
    providing a control system associated with the planter, the control system comprising a seed meter and a row shut off unit for each row of the planter, and a controller operatively connected to each seed meter and each row shut off unit;
    for each row unit, (a) determining if the row shut off unit is in a planting state, (b) if not in a planting state rotating the seed meter to compensate for distance delay, and (c) resuming seed meter rotation at a time when planting is turned on;
    wherein the time when planting is turned on is determined by:
    automatically calculating by the controller associated with the planter, a time delay look-ahead distance based on groundspeed of the planter and a time delay for planter shut off;
    calculating by the controller a total look-ahead distance based on the time delay look-ahead distance and a distance delay look ahead distance;
    determining by the controller if seeding should be off or on at a point in a field at the total look ahead distance; and
    sending a signal to a row shutoff device of the planter to turn planting on.

\* \* \* \* \*